(12) United States Patent  
Tiwari et al.

(10) Patent No.: US 12,312,436 B2  
(45) Date of Patent: May 27, 2025

(54) (SUPER) HYDROPHOBIC MATERIAL AND COATING

(71) Applicant: UCL BUSINESS LTD, London (GB)

(72) Inventors: Manish Kumar Tiwari, Harrow (GB); Graham Leslie Wright, Tadley (GB); Tanmoy Maitra, Middlesex (GB)

(73) Assignee: UCL BUSINESS LTD, London (GB)

( * ) Notice: Subject to any disclaimer, the term of this patent is extended or adjusted under 35 U.S.C. 154(b) by 569 days.

(21) Appl. No.: 17/055,090

(22) PCT Filed: May 10, 2019

(86) PCT No.: PCT/EP2019/062034  
§ 371 (c)(1),  
(2) Date: Nov. 12, 2020

(87) PCT Pub. No.: WO2019/215324  
PCT Pub. Date: Nov. 14, 2019

(65) Prior Publication Data  
US 2021/0206905 A1 Jul. 8, 2021

(30) Foreign Application Priority Data  
May 11, 2018 (GB) .................................... 1807701

(51) Int. Cl.  
*C08L 75/08* (2006.01)  
*C08G 18/50* (2006.01)  
(Continued)

(52) U.S. Cl.  
CPC ......... *C08G 18/5015* (2013.01); *C08G 18/73* (2013.01); *C08G 18/755* (2013.01);  
(Continued)

(58) Field of Classification Search  
CPC .. C08G 18/5015; C08G 18/755; C08G 18/73; C08L 75/08; C09D 175/08  
See application file for complete search history.

(56) References Cited

U.S. PATENT DOCUMENTS

2008/0008838 A1* 1/2008 Arpac ................ C08G 18/5015  
106/287.15  
2011/0046286 A1* 2/2011 Lubnin .................. B82Y 30/00  
977/773  
(Continued)

FOREIGN PATENT DOCUMENTS

CN 102101969 A 6/2011  
CN 103642323 A 3/2014  
(Continued)

OTHER PUBLICATIONS

Tesler, A. B. et al. Extremely durable biofouling-resistant metallic surfaces based on electrodeposited nanoporous tungstite films on steel. Nat Commun 6, 8649, (2015).  
(Continued)

*Primary Examiner* — Michael L Leonard  
(74) *Attorney, Agent, or Firm* — Stites & Harbison PLLC; Richard S. Myers, Jr.

(57) ABSTRACT

The invention provides compositions for forming a hydrophobic or superhydrophobic material, the composition comprising a polyol component having at least two hydroxyl groups per molecule on average; an isocyanate component having at least two isocyanate groups per molecule on average; a single population of nanoparticles having a particle size less than 1 pm; and a solvent; wherein the population of nanoparticles represents at least 5 wt. % of the total of the polyol component, isocyanate component, and population of nanoparticles. The invention also provides hydrophobic or superhydrophobic materials formed from (Continued)

the compositions of the invention, and methods or kits for forming such materials.

16 Claims, 4 Drawing Sheets

(51) Int. Cl.
   *C08G 18/73*   (2006.01)
   *C08G 18/75*   (2006.01)
   *C09D 175/08*  (2006.01)
   *B82Y 30/00*   (2011.01)
   *B82Y 40/00*   (2011.01)
(52) U.S. Cl.
   CPC ............ *C08L 75/08* (2013.01); *C09D 175/08* (2013.01); *B82Y 30/00* (2013.01); *B82Y 40/00* (2013.01)

(56) References Cited

U.S. PATENT DOCUMENTS

| | | | |
|---|---|---|---|
| 2013/0175026 A1* | 7/2013 | Chakraborty | B29C 44/02 166/228 |
| 2014/0208978 A1 | 7/2014 | Sunder et al. | |
| 2015/0284614 A1* | 10/2015 | Gross | C09D 7/70 521/86 |
| 2016/0009971 A1 | 1/2016 | Wang et al. | |
| 2016/0208111 A1 | 7/2016 | Hurley | |
| 2018/0016383 A1 | 1/2018 | Gross et al. | |
| 2018/0037746 A1 | 2/2018 | Nelson et al. | |

FOREIGN PATENT DOCUMENTS

| | | |
|---|---|---|
| CN | 104610728 A | 5/2015 |
| CN | 105111918 A | 12/2015 |
| CN | 105131812 A | 12/2015 |
| CN | 105732940 A | 7/2016 |
| WO | WO2018146252 A1 | 8/2018 |

OTHER PUBLICATIONS

Mates, J. E., Bayer, I. S., Palumbo, J. M., Carroll, P. J. & Megaridis, C. M. Extremely stretchable and conductive water-repellent coatings for low-cost ultra-flexible electronics. Nat Commun 6, 8874, (2015).
Yang, H. et al. Lotus leaf inspired robust superhydrophobic coating from strawberry-like Janus particles. NPG Asia Materials 7, e176, (2015).
Lu, Y. et al. Robust self-cleaning surfaces that function when exposed to either air or oil. Science 347, 1132-1135 (2015).
Steele, A., Bayer, I. & Loth, E. Adhesion strength and superhydrophobicity of polyurethane/organoclay nanocomposite coatings. Journal of Applied Polymer Science 125, E445-E452, (2012).
Deng, X., Mammen, L., Butt, H.-J. & Vollmer, D. Candle Soot as a Template for a Transparent Robust Superamphiphobic Coating. Science 335, 5 (2012).
Azimi, G., Dhiman, R., Kwon, H. M., Paxson, A. T. & Varanasi, K. K. Hydrophobicity of rare-earth oxide ceramics. Nat Mater 12, 315-320, (2013).
Feng, L. et al. Superhydrophobicity of Nanostructured Carbon Films in a Wide Range of pH Values. Angewandte Chemie 115, 4349-4352, (2003).
Wang, C.-F. et al. Stable Superhydrophobic Polybenzoxazine Surfaces over a Wide pH Range. Langmuir 22, 4 (2006).
Golovin, K. et al., Designing Self-Healing Superhydrophobic Surfaces with Exceptional Mechanical Durability. ACS Appl. Mater. & Interfaces 2017, 9, 11212-11223.
Boban, M. et al., Smooth, All-Solid, Low-Hysteresis, Omniphobic Surfaces with Enhanced Mechanical Durability. ACS Appl. Mater. & Interfaces 2018, 10, 11406-11413.

\* cited by examiner

(SUPER) HYDROPHOBIC MATERIAL AND COATING

CROSS REFERENCE TO RELATED APPLICATIONS

This application is a § 371 National State Application of PCT/EP2019/062034 filed May 10, 2019 which claims priority to GB 1807701.6 filed May 11, 2018.

TECHNICAL FIELD

The present disclosure relates to water-repellent "superhydrophobic" compositions including weatherable compositions; the use of these compositions to form superhydrophobic coatings; and methods of making such compositions. Articles formed from or coated with these compositions are also considered as part of the present disclosure, as are methods of making such articles.

BACKGROUND

Superhydrophobic coatings are known in the art both in natural materials, such as lotus leaves, water strider legs, and butterfly wings, and also in artificial materials. Artificial superhydrophobic materials demonstrating mechanical robustness (non-patent reference 1,2), good substrate adhesion (non-patent reference 3-5), ability to sustain some level of abrasion (non-patent reference 6), temperature stability (non-patent reference 7), and chemical resistance (non-patent reference 8-9) are known in the art. However, good performance in one of these parameters tends to occur to the detriment of performance in one or more of the other parameters. It is rare to find good performance in more than one of these parameters and materials showing good performance in large numbers or all of these areas are not known. For example, coatings including inorganic nanoparticles or building blocks (e.g. $TiO_2$, $SiO_2$, rare earth oxides, etc.) offer good mechanical robustness, but they are susceptible to chemical degradation, especially with strong acids and bases. Similarly, organic coatings have good chemical resistance, but poor mechanical properties.

Slippery Liquid-Infused Porous Surfaces (known as "SLIPS") are also known and provide some useful hydrophobic and, in some cases, superhydrophobic properties. However, these rely on infusion of a textured surface with a liquid lubricant to form a surface lubricant layer which imparts some of the hydrophobic properties. This lubricant can, in some cases, evaporate, leach away, or otherwise be depleted over time which impairs the hydrophobic surface properties. Furthermore, these SLIPS are a surface phenomenon, the hydrophobic properties are not embedded in the material itself; rather they are formed at the surface by infusion of a lubricant into the surface structure. As such they are susceptible to abrasion or surface mechanical damage which breaches the hydrophobic layer and reveals the non-hydrophobic bulk material.

Some robust superhydrophobic coatings are known (e.g. PCT/EP2018/053283) and are based on an epoxy resin material combined with nanoparticles. However, epoxy resins are known, over time, to exhibit degradation on exposure to UV radiation and exposure to atmospheric oxygen and humidity. In particular, UV radiation is a notable difficulty when considering epoxy resins. Furthermore, these materials require the use of fluorinated components in their manufacture which requires an additional fluorination step.

Some polyurethane-based hydrophobic coatings are known; for example US2016/0208111 describes durable, flexible, superhydrophobic surfaces comprising a polyurethane base composition incorporating micro- or nano-particles. However, those compositions are two-part formulations requiring two particulate-containing components having specific particle sizes and requiring functionalization of at least one of the particulate populations. Furthermore those compositions require a two-stage application process; first a base layer containing particles followed by a second layer comprising surface-modified particles.

There remains a desire for superhydrophobic materials, particularly surfaces and coatings that show good substrate adhesion, good mechanical and chemical robustness, long-lasting superhydrophobic behaviour and preferably exhibit resistance to weathering in terms of resistance to UV irradiation and atmospheric $O_2$ and humidity.

REFERENCES

Patent References

US2016/0208111 describes durable, flexible, superhydrophobic surfaces formed as a two-layer material comprising a polyurethane base composition incorporating microparticles, and a second layer comprising micro- or nanoparticles.

Non-Patent References

1) Tesler, A. B. et al. Extremely durable biofouling-resistant metallic surfaces based on electrodeposited nanoporous tungstite films on steel. *Nat Commun* 6, 8649, (2015).
2) Mates, J. E., Bayer, I. S., Palumbo, J. M., Carroll, P. J. & Megaridis, C. M. Extremely stretchable and conductive water-repellent coatings for low-cost ultra-flexible electronics. *Nat Commun* 6, 8874, (2015).
3) Yang, H. et al. Lotus leaf inspired robust superhydrophobic coating from strawberry-like Janus particles. NPG Asia Materials 7, e176, (2015).
4) Lu, Y. et al. Robust self-cleaning surfaces that function when exposed to either air or oil. Science 347, 1132-1135 (2015).
5) Steele, A., Bayer, I. & Loth, E. Adhesion strength and superhydrophobicity of polyurethane/organoclay nanocomposite coatings. Journal of Applied Polymer Science 125, E445-E452, (2012).
6) Deng, X., Mammen, L., Butt, H.-J. & Vollmer, D. Candle Soot as a Template for a Transparent Robust Superamphiphobic Coating. *Science* 335, 5 (2012).
7) Azimi, G., Dhiman, R., Kwon, H. M., Paxson, A. T. & Varanasi, K. K. Hydrophobicity of rare-earth oxide ceramics. *Nat Mater* 12, 315-320, (2013).
8) Feng, L. et al. Superhydrophobicity of Nanostructured Carbon Films in a Wide Range of pH Values. Angewandte Chemie 115, 4349-4352, (2003).
9) Wang, C.-F. et al. Stable Superhydrophobic Polybenzoxazine Surfaces over a Wide pH Range. Langmuir 22, 4 (2006).
10) Golovin, K. et al., Designing Self-Healing Superhydrophobic Surfaces with Exceptional Mechanical Durability. ACS *Appl. Mater. & Interfaces* 2017, 9, 11212-11223.
11) Boban, M. et al., Smooth, All-Solid, Low-Hysteresis, Omniphobic Surfaces with Enhanced Mechanical Durability. ACS *Appl. Mater. & Interfaces* 2018, 10, 11406-11413.

SUMMARY

The present proposals relate to compositions for forming a hydrophobic material, preferably a superhydrophobic material, the composition comprising:
- a polyol component having at least two hydroxyl groups per molecule on average;
- an isocyanate component having at least two isocyanate groups per molecule on average;
- a single population of nanoparticles having a particle size less than 1 µm; and
- a solvent;

wherein the population of nanoparticles represents at least 5 wt. % of the total of the polyol component, isocyanate component, and population of nanoparticles.

In some aspects the composition shows good weatherability, e.g. as tested by exposure to UV irradiation and/or atmospheric oxygen and moisture. Such good weatherability is typically achieved by selection of each of the polyol component, isocyanate component, and population of nanoparticles for good weatherability characteristics. Careful selection of each of these components allows the composition to be tailored to achieve good weatherability characteristics.

The present proposals also relate to hydrophobic materials formed by evaporation of solvent from a composition according to the present proposals, the hydrophobic material comprising:
- a cured polyurethane resin; and
- a single population of nanoparticles as defined herein.

Also encompassed in these proposals are kits for forming a hydrophobic material or a composition as described herein.

Also encompassed in these proposals are methods of forming a hydrophobic material, optionally as a coating on an article, the method comprising providing a composition as defined herein, optionally on the surface of an article, and allowing the solvent to evaporate, optionally by heating the composition in air.

FURTHER DEFINITIONS; OPTIONS; AND PREFERENCES

Figure 1:
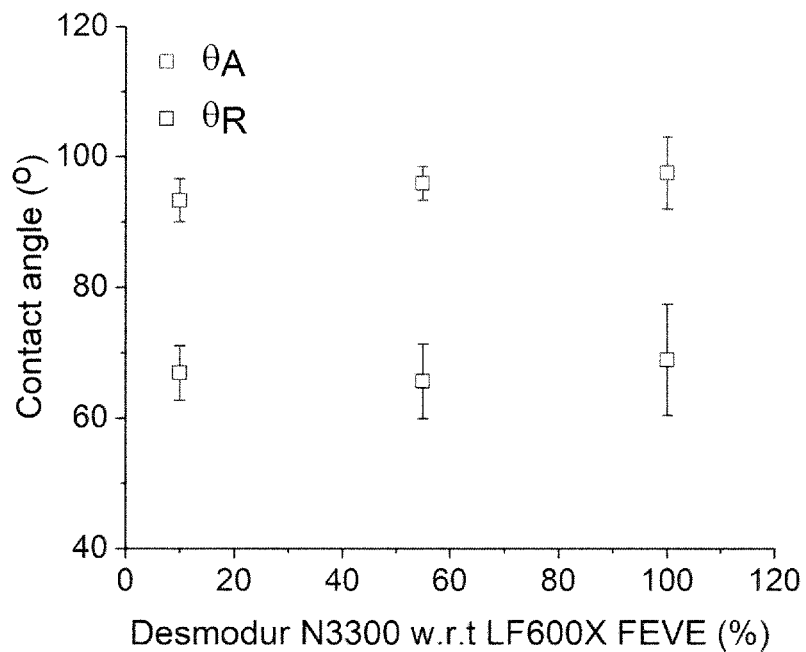
FIG. 1 shows the advancing ($\theta_A$) and receding ($\theta_R$) contact angles on PU coatings at the different concentrations of Desmodur™ N3300 in a Desmodur™ N3300/Lumiflon™ LF 600X FEVE mixture

The term "superhydrophobic" as used herein may be defined as a material on which a water droplet has a surface contact angle of 150° or greater. Additionally or alternatively "superhydrophobic" may be defined as a material having a contact hysteresis with a water droplet of less than 10°. This means that when a water droplet is placed on the surface of the material and the material is tilted, the difference between the contact angle at the advancing (lower) edge of the droplet and the contact angle at the receding (upper) edge of the droplet at the point when the droplet start to move across the surface is less than 10°. The contact angle hysteresis ($\Delta\theta$) can also be determined by gradually increasing (decreasing) the volume of a droplet on the surfaces and recording the advancing (receding) contact angles (denoted as OA and OR, respectively) of the droplet. As used herein the term "hydrophobic" includes "superhydrophobic". In some preferred aspects "hydrophobic" properties are preferably "superhydrophobic".

As used herein the term "weatherable" is used in relation to materials that have good resistance to degradation on exposure to a typical external weather conditions such as exposure to UV radiation and exposure to atmospheric $O_2$ (preferably at terrestrial levels of 21%) for extended periods of time. Resistance to degradation can be measured in various ways but is preferably demonstrated by a retention of hydrophobic properties after exposure.

The present proposals provide a fluid composition that can be used to form a hydrophobic material; the hydrophobic material itself (including both coatings of the hydrophobic material and items formed form the hydrophobic material); and kits used to form the fluid composition.

These proposals also provide methods of making the fluid composition and methods of making a hydrophobic material from the fluid composition.

Methods of forming the present fluid compositions and hydrophobic materials also form part of the present disclosure. The methods of forming the fluid compositions are not particularly limited. Typically they involve intimate mixing of the relevant components to form a stable fluid suspension of nanoparticles in the liquid components.

Formation of a hydrophobic material from such a fluid composition comprises evaporating the solvent from the composition, preferably by heating in air, for example between about 80 and 120° C., e.g. at about 100° C. for about 1 hour, or at about 80° C. for about 1 hour to about 5 hours, to form a hydrophobic material. As an alternative to heating, evaporation of the solvent may be achieved by air drying, e.g. as low as 10° C. for one week. The solvent evaporation conditions are selected to be compatible with the polyol used in the polyurethane and may also be influenced by the degree of catalysation.

Importantly the formation of a hydrophobic material from a fluid composition according to the present proposals can be performed in a single application/curing cycle. Only one application step and one curing step is needed to form the hydrophobic materials. This is in contrast to some of the known methods of forming hydrophobic coatings in which two or more coating and curing cycles are required, e.g. to form a two-layer system.

In some preferred aspects, the fluid composition is applied to a substrate prior to evaporation of the solvent so the hydrophobic material is formed as a coating on the substrate. For example the fluid composition may be applied by spin coating prior to solvent evaporation. When applied as a surface coating, the resultant hydrophobic material preferably has a thickness (when dried) of at least 1 μm, preferably at least 20 μm, preferably at least 50 μm, more preferably between about 20 and 500 μm, for example between about 20 and 100 μm. In some aspects the fluid composition may simply be poured into a mold before the solvent is evaporated leaving a hydrophobic material as a cast block of the material assuming the shape of the mold.

An important feature of hydrophobic materials described herein is that they demonstrate good resistance to environmental degradation.

For example, the coatings and materials preferable demonstrate good resistance to UV irradiation. For example the coatings and materials show low or minimal discolouration on exposure to a UV exposure device, e.g. a Q-UV accelerated weathering tester available from Q-Panel Corporation, or xenon arc lamp. Alternatively weatherability may be measured by exposure at a specialist weather testing farm, e.g. in South Florida, USA.

Preferably the hydrophobic materials retain their hydrophobic properties after exposure to 6 W UV irradiation (wavelength 365 nm) for a period of 1 day, preferably 2 days, preferably 3 days, more preferably 5 days. Preferably the hydrophobic materials are superhydrophobic and retain their superhydrophobic properties under the same conditions.

A further or alternative resistance to environmental degradation may be good resistance to atmospheric oxygen and moisture. Preferably the hydrophobic materials retain their hydrophobic properties (e.g. water contact angle above about) 130° after exposure to ambient terrestrial oxygen levels (atmosphere having 21% $O_2$) and 20-25% humidity (at 1 atm. and room temperature) for a period of 1 day, preferably 2 days, preferably 3 days, more preferably 5 days. Preferably the hydrophobic materials are superhydrophobic and retain their superhydrophobic properties under the same conditions. A further important feature of the hydrophobic materials described herein is that they are of relatively uniform composition. Preferably the particles in the present hydrophobic materials are intimately mixed with the polyurethane component formed from the isocyanate and polyol, it is further preferable that the nanoparticles are combined throughout the polyurethane component, i.e. not localised at a surface of the polyurethane. This means that the hydrophobic properties are exhibited throughout the material with the result that if the surface of the material is damaged, e.g. by abrasion or physical damage, the hydrophobic properties are retained because the material revealed by the damage has the same composition and exhibits the same properties as the material at the surface. This property also means that the present materials can be worn away to a certain degree without loss of beneficial properties, e.g. hydrophobic behaviour. This is different to many surface coating technologies in which any beneficial properties are confined to the surface layer and may be dependent on surface morphology with the consequence that any damage that breaches the surface layer may compromise the beneficial properties. This is the case with many hydrophobic surface technologies such as nanostructured surfaces and some SLIPS surfaces. Therefore the present compositions can provide a surface coating having a much longer lifetime than known superhydrophobic surfaces. Furthermore, the properties are inherent in the material and do not rely on addition or presence of a further surface coating or agent such as an oil or lubricant as required for SLIPS coatings, which may evaporate or disperse from the surface over time. Therefore a significant benefit of the present compositions, materials, and methods is that the hydrophobic materials that are formed are uniform in composition and demonstrate the beneficial properties throughout the material. This uniformity of composition means that the present compositions can be used to form monolithic or cast structures such as board, packaging, bricks, tiles etc. Such structures demonstrate the superhydrophobic properties throughout the structure meaning that even if the structure is damaged, e.g. by cutting, breaking, surface scratches etc., the superhydrophobic properties will not be compromised and no additional treatment of the damaged area (e.g. reinfusion with a lubricant oil) is needed.

The present hydrophobic materials exhibit excellent water repellent properties. In particular preferred embodiments, the materials are superhydrophobic. Preferably the materials have a water contact angle of 120° or more, preferably 130° or more, preferably 150° or more, more preferably 155° or more, more preferably 160° or more.

The present materials also preferably exhibit good (low) water contact hysteresis. In preferred embodiments, the contact hysteresis is 15° or less, preferably 12° or less, preferably 10° or less.

The present materials also preferably exhibit low water drop sliding angles (WSA), i.e. the angle to which the substrate must be tilted away from horizontal before a water drop on the surface starts to slide. In preferred embodiments, the WSA is less than 10°, preferably less than 8°, preferably less than 5°, preferably less than 4°, preferably less than 3°.

The present materials also preferably demonstrate good physical robustness. In some cases, the materials also show excellent resilience to abrasion with minimal or no loss of hydrophobic properties. This physical robustness is thought to be due, at least in part, to the use of a polyurethane resin component in the material composition, in particular selection of an appropriate polyol component to form the polyurethane resin.

The present materials are also preferably resistant to chemical degradation. In preferred aspects, the materials are resistant to chemical attack by highly oxidising and/or highly basic conditions, e.g. aqua regia and/or NaOH. This is particularly the case in some aspects where the material is formed from all organic components, i.e. does not contain inorganic components. In particular in some options the nanoparticles in the present compositions are organic in nature, i.e. not inorganic, as these compositions may demonstrate particularly good resistance to chemical attack. The chemical resistance preferably depends largely on the resistance of the polyurethane resin to chemical degradation which can be largely controlled by appropriate selection of the polyol component used to form the polyurethane resin.

The present materials preferably also exhibit excellent corrosion resistance. Corrosion resistance may, in some cases, encompass the resistance to chemical degradation mentioned above. However, corrosion resistance also includes degradation due to exposure to the air, particularly moisture and/or oxygen in the air (e.g. rusting or other surface oxidation of materials). Additionally, the corrosion resistance can also indicate resistance to salt (e.g. NaCl) solutions, as is typical in marine applications. Such corrosion resistance makes the present materials excellent candidates for the formation of corrosion resistant coatings, for example to protect corrosion-susceptible surfaces, such as ferrous metals and other structural metals such as aluminium, copper, titanium etc and their alloys.

In preferred aspects, the present materials demonstrate at least two, preferably at least three, preferably all of the above mentioned benefits.

While some of the above-mentioned benefits and properties of the present materials are known in the art, materials demonstrating multiple of these benefits are unusual or unknown. For example it is not known to provide a superhydrophobic material that is physically and chemically robust while also having excellent adhesion to a substrate to which it has been applied, and showing good resistance to degradation upon exposure to UV radiation and/or atmospheric moisture and oxygen.

Polyurethane Resin

The present materials include a polyurethane (PU) resin component. The use of a PU resin is beneficial because the physical and chemical properties of the resin can be selected and tailored by choice of the components used to form the PU composition.

A variety of PU resins are known in the art and have a wide variety of different chemical and physical properties. This includes a large variation in flexibility, hardness, mechanical durability, resistance to chemical corrosion, weatherability (including resistance to degradation by UV light and/or resistance to degradation by environmental moisture and oxygen). Therefore, by using a PU resin system it is possible to select appropriate physical and chemical characteristics for the PU resin which will influence the characteristics of the overall present materials. The chemical and physical properties may be tailored by selection of appropriate isocyanate and polyol components as discussed below.

Preferred PU resins demonstrate excellent adhesion of the material to surfaces which means that the resultant coating is robust and does not easily peel away from a surface to which it is adhered. Peeling of hydrophobic surfaces from the underlying substrate is a common mode of failure so this good adhesion is an improvement and a benefit of the present compositions. Furthermore, the PU resin preferably provides good chemical stability to the materials and can contribute to the corrosion resistant properties. In particular the PU resin preferably demonstrates good weatherability, e.g. high resistance to degradation by UV light and/or high resistance to degradation by environmental moisture and oxygen. In general the use of a PU resin provides a significantly greater ability to tailor the physical and chemical properties of the resin to suit the desired application than when other resins are used, e.g. epoxy resins.

The PU resin is formed from an isocyanate compound comprising at least two isocyanate moieties and a polyol compound comprising at least two hydroxyl moieties. Upon curing the polyol groups and the isocyanate groups react to form the polyurethane polymer.

The curing may be initiated by heat or UV light or the curing may simply occur under ambient conditions following contact of the polyol and isocyanate components.

Suitable PU resins may be obtained commercially and may include both one-component "1K" resins, which typically cure on evaporation of solvent, and two-component "2K" resins which cure on contact of the polyol component with the isocyanate. It is noted that both types of resin include a polyol component and an isocyanate component, the difference between the 1K and 2K resins being primarily in their commercial composition as a single- or dual-component product.

Suitable one-component "1K" resins include, but are not limited to, the following. Preferably the PU resin (polyol and isocyanate component combined) is selected from one or more of those listed in the table below.

| Manufacturer | Resin |
|---|---|
| DSM Coating Resins | NeoPac ™ E125 |
| DSM Coating Resins | NeoRez ™ R961 |
| Allnex | Daotan ™ TW 1237/32WANEP |
| Allnex | Daotan ™ TW6473/37WA |
| Covestro | Bayhydrol ™ A2846 |
| Covestro | Desmolac ™ 4340 X/iB |

Polyol Compound

In general terms, the polyol component must contain at least two hydroxyl moieties per molecule to react with the isocyanate component and form the PU resin. Preferably the level of hydroxyl functionality in the polyol component (indicating the average number of hydroxyl groups per molecule in the polyol component) is at least 2 and up to 5, preferably between 2 and 4, preferably between 2 and 3, preferably between 2 and 2.5.

The polyol component may be any compound having the requisite level of hydroxyl functionality. However, preferably the polyol component is selected from polyethers, vinyl polyethers, acrylics, polyesters, polyamides, polyacrylates, and polycarbonates having the requisite level of hydroxyl functionality. More preferably selected from polyethers, vinyl polyethers, acrylics and polyesters.

In some cases the polyol component is a fluorinated polyol, preferably a perfluorinated polyol.

In some cases the polyol component is selected from aliphatic polyols, in particular acrylic polyols.

Aliphatic polyols are preferred because they contribute to imparting good weatherability, in particular their resistance to UV degradation to the materials described herein on curing of the PU component.

Acrylic polyols are preferred for their balance of weatherability, chemical resistance, impact resistance, hardness, and adhesion.

In some cases the polyol component is selected from perfluorinated polyols. For example perfluorinated polyethers, preferably perfluorinated vinyl polyethers.

The polyol component is preferably selected from commercially available materials, the key selection criteria being the required properties of the final film. For a highly weatherable film, acrylic polyols are preferred, lower levels of weatherability may be achieved using polyester polyols and some polyethers, as known in the art. The selection of the polyol may also influence the performance properties, those skilled in the art are able to form coatings which may be hard and brittle, hard and flexible, soft and flexible or even rubbery by appropriate selection of the polyol component. The selection of polyol may also influence the adhesion to a substrate, those skilled in the art are able to select polyols to develop coatings with adhesion to a wide range of metallic, polymeric and other synthetic substrates.

Suitable polyols for use in two-component "2K" resins include, but are not limited to, the following. Preferably the polyol component is selected from one or more of those listed in the table below.

| Manufacturer | Polyol |
| --- | --- |
| DSM Coating Resins | Uralac ™ CY240 EF75 |
| DSM Coating Resins | Uralac ™ CY245 EF75 |
| DSM Coating Resins | Uralac ™ CY250 EF75 |
| DSM Coating Resins | NeoCryl ™ AF10 |
| DSM Coating Resins | NeoCryl ™ XK540 |
| DSM Coating Resins | NeoCryl ™ XK555 |
| Allnex | Macrynal ™ SM510n/60LG |
| Allnex | Setalux ™ 1202 SS-70 |
| Allnex | Setalux ™ D A 575X |
| Allnex | Setaqua ™ 6515 |
| Allnex | Macrynal ™ SM 6826w/43WA |
| Allnex | Macrynal ™ VSM 6299w/42WA |
| Asahi Glass | Lumiflon ™ TM LF600X |
| Asahi Glass | Lumiflon ™ LF910LM |
| Asahi Glass | Lumiflon ™ FD1000 |
| Covestro | Bayhydrol ™ A2058 |
| Covestro | Bayhydrol ™ A145 |

Isocyanate Compound

In general terms, the isocyanate component must contain at least two isocyanate moieties per molecule to react with the polyol component and form the PU resin. Preferably the level of isocyanate functionality in the isocyanate component (indicating the average number of isocyanate groups per molecule in the isocyanate component) is at least 2 and up to 5, preferably between 2 and 4, preferably between 2 and 3, preferably between 2 and 2.5.

The isocyanate may be an aliphatic or aromatic isocyanate. In some preferred cases the isocyanate is an aliphatic isocyanate. Aliphatic isocyanates are preferred because they contribute to imparting good weatherability, in particular their resistance to UV degradation to the materials described herein on curing of the PU component. Aromatic isocyanates may be used but are less preferred because they tend to have lower weatherability, e.g. they tend to yellow over time. Preferred isocyanates herein are prepolymers based upon hexamethylene diisocyanate and isophorone diisocyanate (the aliphatic nature of both contributes to good weatherability in the resultant materials), preferably hexamethylene diisocyanate.

Along with the polyol component, the isocyanate component is preferably selected from commercially available materials, the key selection criteria being the required properties of the final film, e.g. good weatherability.

Suitable isocyanates for use in two-component "2K" resins include, but are not limited to, the following. Preferably the isocyanate component is selected from one or more of those listed in the table below.

| Manufacturer | Isocyanate |
| --- | --- |
| Covestro | Desmodur ™ N3300 |
| Covestro | Desmodur ™ DN |
| Covestro | Desmodur ™ XP2489 |
| Covestro | Bayhydur ™ Ultra 304 |
| Vencorex | Tolonate ™ HDB |
| Vencorex | Easaqua ™ WAT 3 |

Nanoparticles

A population of nanoparticles is included in the present compositions at least in part to introduce beneficial surface texture to the hydrophobic materials which improves the hydrophobic behaviour. Inclusion of the nanoparticles typically results in an improvement in hydrophobic behaviour.

The term "nanoparticles" refers to particles having a particle size (i.e. a measurement in at least one dimension preferably a spherical equivalent diameter (e.g. as measured by laser diffraction)) on the nanometer scale, i.e. less than 1000 nm.

The nanoparticles in the present context preferably have a particle size in the range 1 to less than 1000 nm, preferably 10-750 nm, preferably 10-500 nm, preferably 50-500 nm, more preferably 100-400 nm, more preferably 50-250 nm, such as about 100-300 nm.

Preferably the population of nanoparticles has a narrow particle size distribution, such as a particle size distribution having a span less than 1.5, preferably less than 1, preferably less than 0.8, preferably less than 0.6, preferably less than 0.5 where span=((D90−D10)/D50).

The compositions described herein comprise a single population of nanoparticles. Surprisingly such compositions can form materials having hydrophobic properties, even superhydrophobic properties, despite containing only a single population of nanoparticles. This is in contrast to compositions and materials containing multiple particle populations of different sizes.

The nanoparticles in the compositions preferably have a unimodal particle size distribution.

Preferably the present compositions contain no other particles, such as particles larger than the upper limit of the size range.

As defined herein the particle size refers to the size of the particles themselves and not any larger components that may be formed by agglomeration of individual particles.

Preferably the nanoparticles used in the present compositions are not surface-modified nanoparticles, e.g. those having been reacted to have functional chemical groups attached to them. Surprisingly such compositions can form materials having hydrophobic properties, even superhydrophobic properties even without requiring surface modification of the nanoparticles. This provides the benefit that the compositions are simpler and cheaper to manufacture.

In preferred aspects, the amount of nanoparticles included in the composition is below about 85 wt. % of the composition excluding solvent (i.e. 85 wt. % of the overall composition including the polyol/polyether compound, isocyanate compound, and nanoparticles, excluding the solvent).

Above about 85 wt. % coatings formed from the composition by evaporation of the solvent typically start to show reduced adhesion to the coated substrate and reduced mechanical robustness. This is thought to be because the nanoparticles are typically relatively soft compared to the PU resin so an increased loading of nanoparticles typically decreases wear resistance of the material. Also, nanoparticles often display relatively weak interfacial bonding to the polyurethane resin so increasing the loading of nanoparticles, particularly above a certain threshold, may reduce the overall physical robustness of the material. This is particularly the case when the nanoparticles are formed from the preferred polytetrafluoroethylene (PTFE) material. Preferably the amount of nanoparticles included in the composition is below about 85 wt. %, preferably about 80 wt. % or lower, preferably about 75 wt. % or lower.

The amount of nanoparticles included in the composition is at least about 5 wt. %, preferably above about 10 wt. %, preferably above about 20 wt. %, preferably above about 25 wt. %, more preferably above about 30 wt. % of the overall composition. In preferred aspects, the amount of nanoparticles included in the composition is in the range about 5 wt. % to about 75 wt. %, in some aspects between about 5 wt. % and about 30 wt. %, in some aspects between about 25 wt. % to about 75 wt. %.

It is surprising that materials having hydrophobic properties, even superhydrophobic properties can be formed as viable, robust, weatherable coatings or materials incorporating a relatively large amount of nanoparticles. Typically many compositions for forming hydrophobic coatings comprise less than 5 wt. % particulates.

The material from which the nanoparticles are formed may be selected from any inorganic or organic material, such as $Al_2O_3$, $TiO_2$, $SiO_2$, ZnO, MnO, PTFE, $CeO_2$, graphene, graphene oxide, carbon nanotubes, and carbon black. Preferably the material is itself hydrophobic, for example the material may be fluorinated or treated with hydrophobic alkyl/alkoxy silanes. Preferably the material is an organic material, more preferably a fluorinated organic material. Organic nanoparticles such as PTFE, graphene, graphene oxide, carbon nanotubes, and carbon black, preferably PTFE, are preferred because they are typically more chemically robust than inorganic materials, for example $TiO_2$ and $SiO_2$ may be susceptible to chemical degradation. Mesoporous forms of nanoparticles formed from these materials may also or alternatively be used in the present proposals.

Preferably PTFE nanoparticles are used because these have high intrinsic hydrophobic properties and are chemically inert, so the resultant hydrophobic material formed from the compositions has excellent hydrophobic properties combined with high resistance to chemical degradation and corrosion.

Solvent

The solvent in the present compositions may be determined by compatibility with the substrate to which the composition is to be applied. The solvent is also selected to ensure that the relatively viscous PU resin components can be thoroughly mixed, i.e. to thin the composition, and to fully solubilise the isocyanate and polyol components (to avoid precipitation of either component during evaporation of the solvent), and to be compatible with any surface to which the composition is applied. In some preferred aspects, the solvent may be an organic solvent, e.g. selected from ketones or acetates (such as acetone) or aromatic hydrocarbon solvents such as toluene or para-xylene.

Other Components

The present compositions may also comprise one or more other components selected from colourants, UV stabilisers, rheology modifiers, plasticisers, dispersants, wetting agents, anti setling agents, and surfactants.

In some preferred embodiments the present compositions further comprise piperylene which, for some PU resins, has the effect of retarding degradation of the hydrophobic nature of a coating formed from such a composition.

Furthermore, in the present compositions the PU resin may be blended with additional polymeric components which may be used to alter the physical characteristics of the polymeric component of the compositions. An example of this additional polymeric component is polydimethyl siloxane which may be included to improve the hydrophobicity and flexibility of the composition.

In some aspects a perfluorinated polyether oil or silicone oil may be included in the present compositions. In some cases the perfluorinated polyether oil or silicone oil may be combined with the nanoparticle population prior to mixing of the particles into the present compositions. Preferably the lubricant is selected from perfluorinated polyethers.

The inclusion of a perfluorinated polyether oil or silicone oil may, in some cases, improve the hydrophobic nature of the composition, preferably it raises the water contact angle indicating that the composition is more hydrophobic than a similar composition excluding this component.

In cases where the lubricant is a perfluorinated polyether component, it is preferably a perfluoroalkylether. In preferred cases, the alkyl chain of the monomer may be 1-10 carbon atoms long, for example 1-6 carbon atoms long, preferably 2-4 carbon atoms long.

Preferred perfluorinated polyether components are selected from fluorocarbon ether polymers of polyhexafluoropropylene oxide, e.g. having a chemical formula II

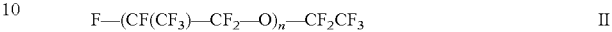

$$F-(CF(CF_3)-CF_2-O)_n-CF_2CF_3 \qquad \text{II}$$

wherein the degree of polymerization, n, is typically in the range of 10 to 60. Such compounds are commercially available as the Krytox® range of oils from DuPont or Fomblin® range of oils from Solvay. Some preferred perfluorinated polyether components are Krytox® 1506, Krytox®1514, Krytox®1525, Fomblin® Y, LVAC and Fomblin® Y, HVAC etc. In preferred embodiments Krytox® 1506 is used.

In cases where the lubricant is a silicone compound, it is preferably a silicone oil or grease, most preferably a silicone oil e.g. poly(dimethyl-siloxane), poly(phenyl-methyl-siloxane), etc.

In some embodiments the lubricant is present at a level of 0.5-25 wt. %, preferably 1-20 wt. %, more preferably 1-15 wt. %, more preferably 1-10 wt. %, most preferably 1-5 wt. % of the overall composition (calculated excluding the solvent).

If too much of the perfluorinated polyether oil or silicone oil component is included, this component starts to be present at the surface of the resultant hydrophobic material. This is comparable to Slippery Liquid-Infused Porous Surfaces (SLIPS) in which the liquid component is present at the surface of a coating. For example, where the perfluorinated polyether oil or silicone oil is a liquid (as in preferred embodiments) if too much of this component is included, the surface of the resultant hydrophobic material appears wet, to touch and/or visual inspection.

This is undesirable as it can mean that the perfluorinated polyether oil or silicone oil can be transferred from the surface of the hydrophobic material by contact. One of the benefits of the present compositions is that the hydrophobic material appears dry to both touch and visual inspection. Furthermore, if too much of the perfluorinated polyether oil or silicone oil component is included, roll-off speed of a water drop placed on a surface of the material may be impaired, possibly due to the roll-off speed being controlled by the viscosity of the perfluorinated polyether oil or silicone oil at the surface. Therefore, it is undesirable to include this component in an amount greater than the upper limit mentioned above.

Kits

A further proposal herein includes a kit comprising a first fluid comprising a polyol or polyether component as defined herein, and a second fluid comprising an isocyanate component as defined herein; wherein at least one of the two fluids further comprises a population of nanoparticles as defined herein. One or both fluid may optionally further comprise a solvent as defined herein, preferably both kits comprise said solvent. Such kits may be used by mixing together the two components to form a fluid composition suitable for preparing a hydrophobic material on evaporation of the solvent.

Preferred Combinations

Any of the features and preferences described herein may be combined in any combination insofar as they are compatible. However, some preferred aspects are set out below.

In a preferred aspect, the composition for forming a hydrophobic material is made by combining:

A polyether, vinyl polyether or polyester polyol, for example Macrynal SM510n/LG polyol (from Allnex) or Uralac CY240 EF75 (from DSM resins)

An aliphatic isocyanate, for example Desmodur N3300 isocyanate (from Covestro)

A population of PTFE nanoparticles, preferably having a particle size in the range 50-500 nm; and an organic solvent.

In a preferred aspect, the hydrophobic material is formed by evaporation of the solvent from a composition according to one of the above described preferred compositions Upper and lower numerical limits herein are freely combinable (any upper limit with any lower limit) to define ranges as required. All such ranges are taken to be explicitly disclosed herein insofar as they are compatible with the present invention.

EXAMPLES

The following Examples are provided by way of illustration of the present proposals and do not limit the present disclosure.

Materials and Methods

Aliphatic isocyanate compound based on hexamethylene diisocyanate (HDI) (Desmodur N3300™), was obtained from Covestro (Leverkusen, Germany).

Acrylic polyol, Macrynal SM510n/LG S (and acrylic resin in a xylene/butyl acetate solvent where the resin has an average of 4.5% OH groups). and perfluorovinyl ether having alternating fluoroethylene and alkyl vinyl ether segments (FEVE) (Lumiflon LF 600X FEVE), were obtained from Allnex (Frankfurt, Germany) and AGC chemicals (AGC Chemicals Europe, Ltd. Thornton Cleveleys, UK), respectively.

PTFE particles with a diameter of 200 nanometres, received from Sigma Aldrich, were used as the population of nanoparticles.

p-Xylene obtained from Sigma Aldrich was used as a solvent and clean glass slides were used as substrates.

A spin coater with a constant speed was used to coat glass slides with the smooth films. For coating with PTFE particles dispersed polymer solutions, an airbrush with a nozzle diameter of 1 mm was used for fine mist spraying and to demonstrate the large area application potential. A nitrogen back pressure of 2.4 bar was maintained during the spraying process.

Atomic force microscope (AFM, Veeco, Bruker) with a cantilever of radius of curvature of 10 nm was used to study the surface topology of PU/PTFE based superhydrophobic coatings.

Example 1—Preparation of Polyurethane (PU) Compositions

Two sets of samples were prepared from Desmodur mixed in different ratios with each of the two different resins—the perfluoro vinyl ether LF 600X FEVE (Lumiflon) and polyol Macrynal 510 S. The mixtures prepared were as follows.

| Desmodur wt. % | Macrynal 510S wt. % | Desmodur wt. % | LF600X FEVE wt. % |
|---|---|---|---|
| 10 | 90 | 10 | 90 |
| 50 | 50 | 50 | 50 |

The mixtures were diluted with p-xylene to facilitate mixing of the viscous components.

Example 2—Wettability of PU Coatings

The effect of the concentration of Desmodur on the water drop contact angle (wettability) of the resulting PU was investigated without any filler particles. The compositions prepared in Example 1 were spin coated on clean glass substrates at a speed of 500 r.p.m. for 1 minute. Next, the coated glass slides were cured at 200° C. for 2 hours followed by cooling down to room temperature. The advancing and receding contact angles of the corresponding polymer films were then measured.

Figure 2:
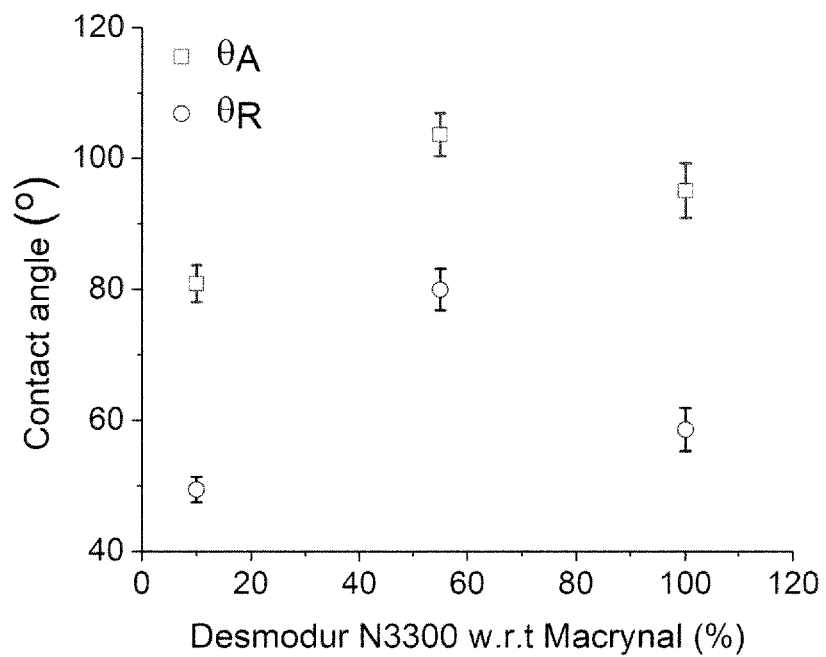
FIG. 2 shows the advancing ($\theta_A$) and receding ($\theta_R$) contact angles on PU coatings at the different concentrations of Desmodur™ N3300 in a Desmodur™ N3300/Macrynal™ SM510n/60LG mixture

Results are shown in FIGS. 1 and 2 which shows the advancing ($\theta_A$) and receding ($\theta_R$) contact angles on PU coatings at the different concentrations of Desmodur N3300.

In the Macrynal SM510n/LG/Desmodur N3300 based PU films, the OA of coating were above 90° when the ratio of Desmodur N3300 to Macrynal SM510n/LG was 1:1 (FIG. 1).

In the Lumiflon LF 600X FEVE/Desmodur N3300 based PU films (FIG. 2), OR was below 90° for all the tested concentrations of Desmodur N3300. OA and OR practically remains unaffected with the concentration of Desmodur N3300.

Example 3—Preparation of PU/PTFE Superhydrophobic Coatings

To prepare the coatings, two different composite dispersions were prepared based on Macrynal SM510n/60LG/Desmodur N3300 or Lumiflon LF 600X FEVE/Desmodur N3300 mixtures, with PTFE particles as filler in each case. The stoichiometric amount of Macrynal SM510n/60LG/Lumiflon LF600X FEVE in Desmodur N3300 were mixed, and diluted with p-Xylene. Subsequently, PTFE particles were added to the dispersion, and stirred continuously for ~2 hrs. Thereafter, dispersions were sprayed on clean glass plates using an airbrush. Finally, coated glass slides were cured at 200° C. for two hours.

The typical composition of each coating is given below.

| LF 600X FEVE/Desmodur | | MACRYNAL/Desmodur | |
|---|---|---|---|
| LF 600X FEVE | 1.0 g | MACRYNAL | 1.0 g |
| Desmodur | 0.2 g | Desmodur | 1.92 g |
| PTFE particles | 4.0 g | PTFE particles | 4.0 g |
| p-xylene | 15 g | p-xylene | 15 g |

Figure 3:
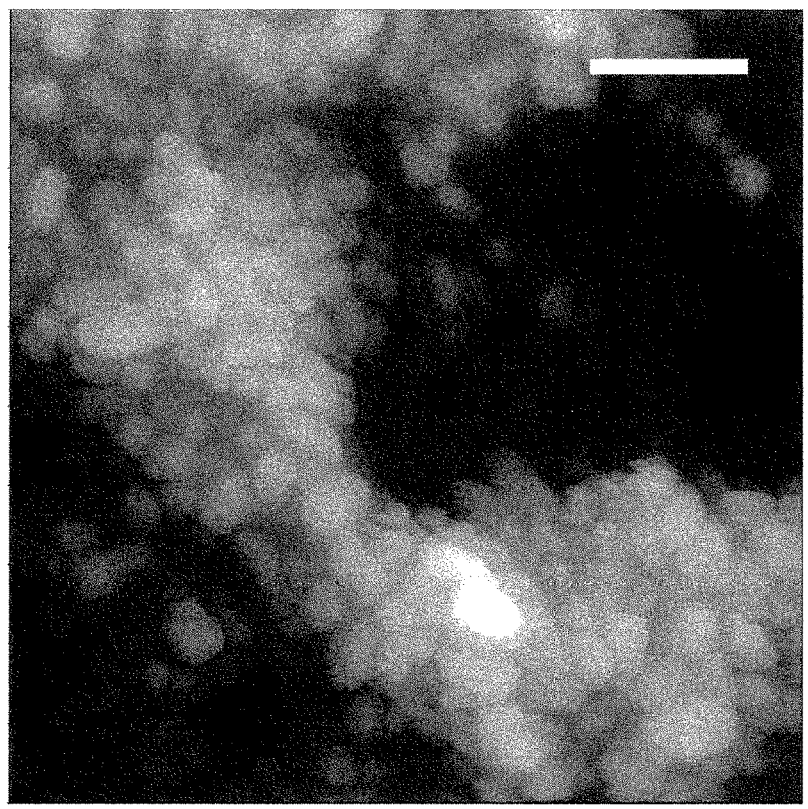
FIG. 3 shows an Atomic Force Microscopy (AFM) image of a superhydrophobic coating based on a Desmodur™ N3300/Macrynal™ SM510n/60LG PU composition incorporating PTFE particles (scale bar 1 µm).
Figure 4:
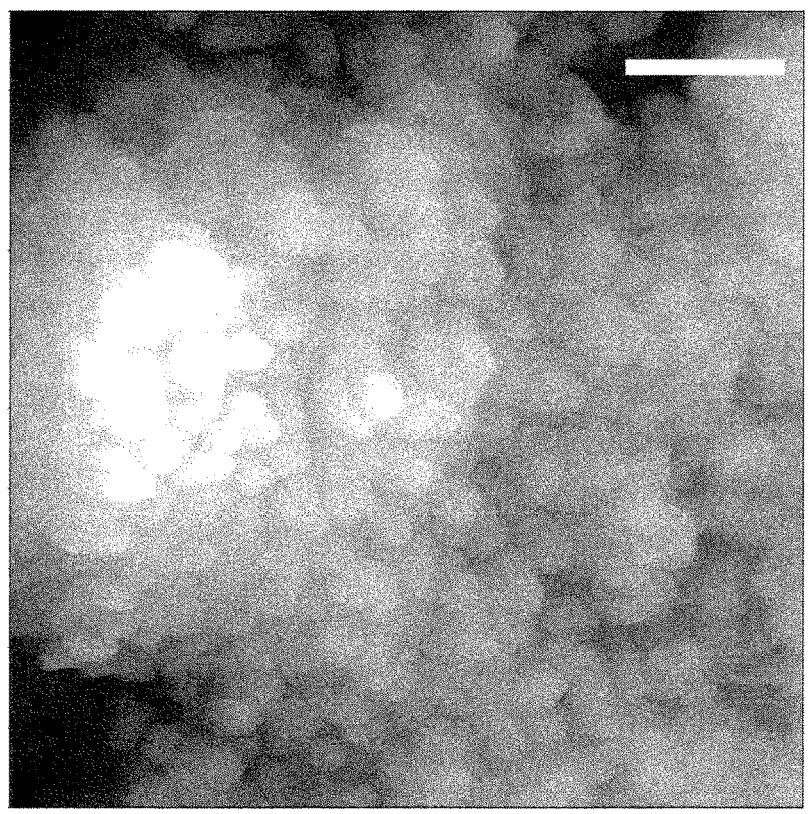
FIG. 4 shows an AFM image of a superhydrophobic coating based on a Desmodur™ N3300/Lumiflon™ LF 600X FEVE PU composition incorporating PTFE particles (scale bar 1 µm).

AFM images of the Macrynal SM510n/60LG and Lumiflon LF 600X FEVE based superhydrophobic PU coatings are shown in FIGS. 3 and 4 respectively. [Scale bars 1 µm]. PTFE particles are clearly visible, as is the micro and nanotexture resulting from the spraying process. It is noted in this AFM image that some agglomeration of the nanoparticles is observed to form larger particulate clusters.

Example 4—Room Humidity and UV Chamber Tests

The coatings prepared in Example 3 were tested for degradation on exposure to ambient humidity and UV irradiation. The advancing and receding contact angles on polymer films were measured at 1 day, 2 days, and 5 days after exposing them at room temperature to ambient humidity conditions (~23%) and after UV exposure (6 W) in a UV chamber (wavelength 365 nm). The results are shown in FIGS. 5-8.

Figure 5:
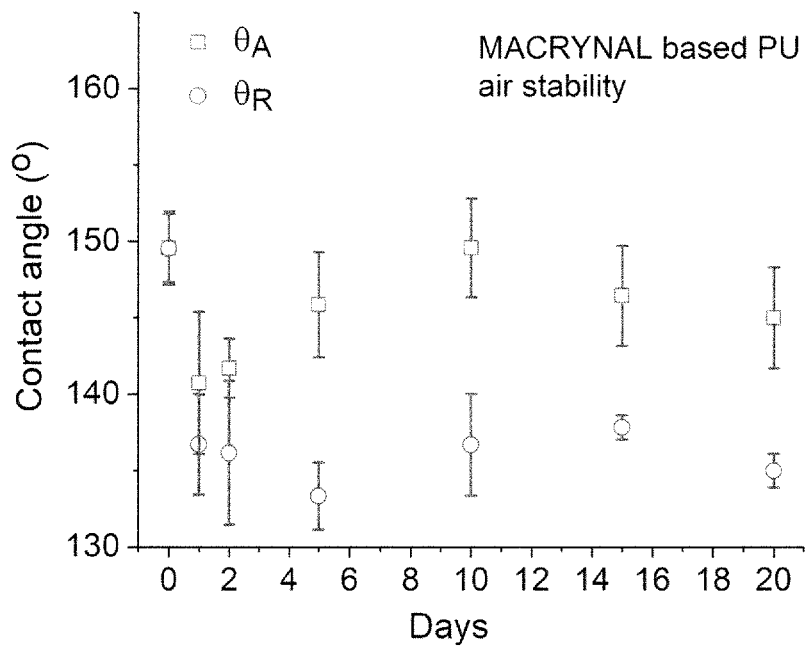
FIG. 5 shows time evolution of advancing ($\theta_A$) and receding ($\theta_R$) contact angles of a Desmodur™ N3300/Macrynal™ SM510n/60LG PU coating incorporating PTFE particles after exposure to atmospheric humidity at ~23%.
Figure 6:
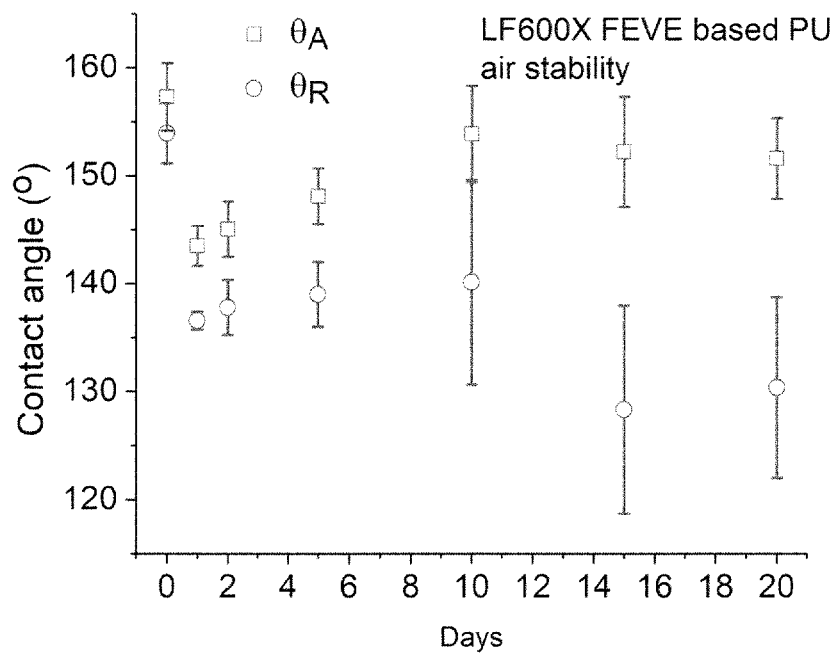
FIG. 6 shows time evolution of advancing ($\theta_A$) and receding ($\theta_R$) contact angles of a Desmodur™ N3300/Lumiflon™ LF 600X FEVE PU coating incorporating PTFE particles after exposure to atmospheric humidity at ~23%.

FIGS. 5 and 6 show change in the coating wettability over time on with exposure to ambient air. The figures clearly indicate that contact angles ($\theta_A$ and $\theta_R$) of PU/Teflon based superhydrophobic coating decrease on exposure to ambient air at typical humidity levels of ~23%.

Figure 7:
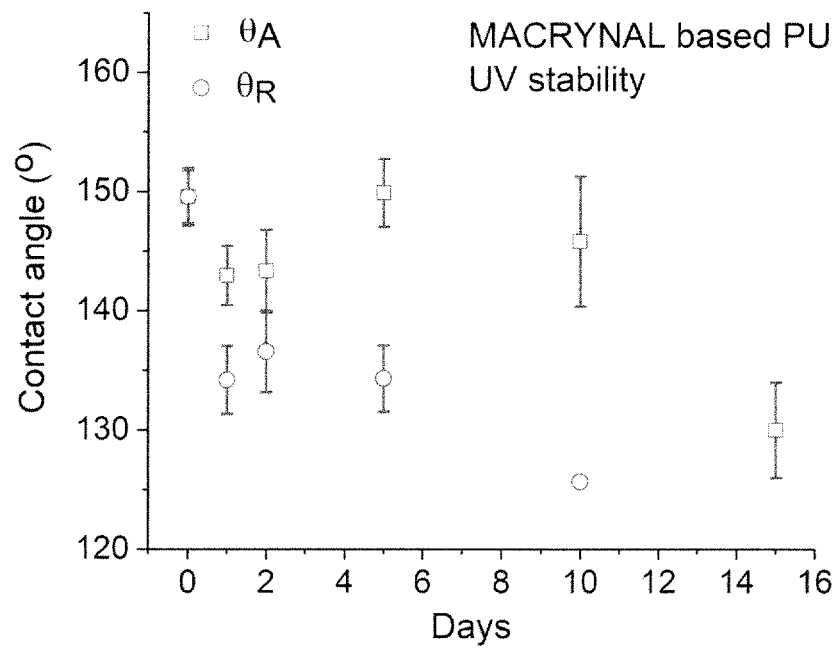
FIG. 7 shows time evolution of advancing ($\theta_A$) and receding ($\theta_R$) contact angles of a Desmodur™ N3300/Macrynal™ SM510n/60LG PU coating incorporating PTFE particles after exposure to UV radiation under a 6 W UV source.
Figure 8:
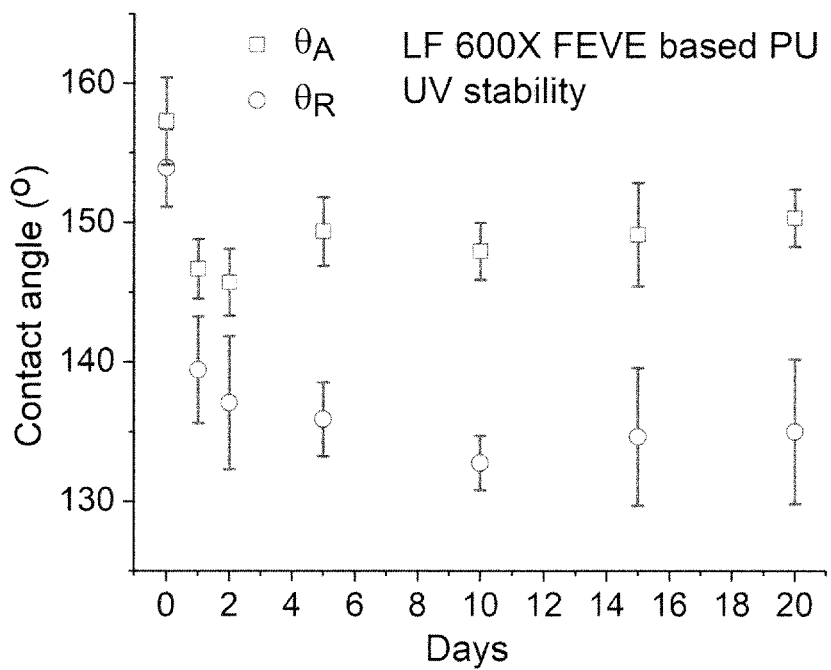
FIG. 8 shows time evolution of advancing ($\theta_A$) and receding ($\theta_R$) contact angles of a Desmodur™ N3300/Lumiflon™ LF 600X FEVE PU coating incorporating PTFE particles after exposure to UV radiation under a 6 W UV source.

FIGS. 7 and 8 show changes in coating wettability ($\theta_A$ and $\theta_R$) on exposure to UV radiation. The degradation of Macrynal SM510n/60LG and Lumiflon LF 600X FEVE based PU/PTFE superhydrophobic coatings is apparent from the OR variation. For both coatings, OR progressively decreases with the exposure to UV radiation.

The invention claimed is:

1. A composition for forming a hydrophobic material, the composition comprising a polyol component having at least two hydroxyl groups per molecule on average;
   an isocyanate component having at least two isocyanate groups per molecule on average;
   a single population of nanoparticles having a particle size in the range 10-500 nm; and
   a solvent;
   wherein the population of nanoparticles represents above 20 wt. % of the total of the polyol component, isocyanate component, and population of nanoparticles;
   wherein the population of nanoparticles has a unimodal particle size distribution;
   wherein the population of nanoparticles satisfies the relationship ((D90–D10)/D50)<1.5; and
   wherein the nanoparticles in said population of nanoparticles are not surface modified.

2. A composition according to claim 1, wherein the population of nanoparticles represents at least 25 wt. % of the total of the polyol component, isocyanate component, and population of nanoparticles.

3. A composition according to claim 1, wherein the nanoparticles in said population of nanoparticles are formed from a material selected from the group consisting of $Al_2O_3$, $TiO_2$, $SiO_2$, ZnO, MnO, PTFE, $CeO_2$, graphene, graphene oxide, carbon nanotubes, and carbon black.

4. A composition according to claim 1, wherein the polyol component is selected from the group consisting of polyether polyols, vinyl polyether polyols, polyester polyols, polyamide polyols, polyacrylate polyols, and polycarbonate polyols.

5. A composition according to claim 1, wherein the polyol component is a perfluorinated polyol.

6. A composition according to claim 1, wherein one or both of the polyol component and the isocyanate component is aliphatic.

7. A composition according to claim 1, wherein the isocyanate component is selected from the group consisting of a trimer of hexamethylene diisocyanate, and polyisocyanates based on isophorone diisocyanate.

8. A hydrophobic material formed by evaporation of solvent from a composition according to claim 1, the hydrophobic material comprising:
   a cured polyurethane resin; and
   the single population of nanoparticles.

9. A kit for forming a hydrophobic material according to claim 8, the kit comprising a first component comprising a polyol component having at least two hydroxyl groups per molecule on average, and a second component comprising an isocyanate component having at least two isocyanate groups per molecule on average, wherein one of the components further comprises the single population of nanoparticles having a particle size in the range of 10-500 nm, wherein the population of nanoparticles represents above 20 wt. % of the total of the polyol component, isocyanate component, and population of nanoparticles;
   wherein the population of nanoparticles has a unimodal particle size distribution, the population of nanoparticles satisfies the relationship ((D90–D10)/D50)<1.5, and wherein the nanoparticles in said population of nanoparticles are not surface modified.

10. An article made from or coated with a composition according to claim 1.

11. A method of forming a hydrophobic material, the method comprising providing a composition according to claim 1, and allowing the solvent to evaporate.

12. A composition according to claim 4, wherein the polyol component is a perfluorinated polyol.

13. A composition according to claim 1, wherein the nanoparticles in said single population of nanoparticles are formed from PTFE.

14. A composition according to claim 2, wherein the population of nanoparticles represents 25 to 75 wt. % of the total of the polyol component, isocyanate component, and population of nanoparticles.

15. A composition according to claim 1, wherein:
   said polyol component having at least two hydroxyl groups per molecule on average is selected from the group consisting of polyethers, vinyl polyethers, and polyester polyols;
   said isocyanate component having at least two isocyanate groups per molecule on average is an aliphatic isocyanate;
   the nanoparticles in said single population of nanoparticles having a particle size in the range of 10-500 nm are formed from PTFE; and
   said solvent is an organic solvent.

16. An article made from or coated with a hydrophobic material according to claim 8.

* * * * *